US011511236B2

(12) United States Patent
Furukawa et al.

(10) Patent No.: US 11,511,236 B2
(45) Date of Patent: Nov. 29, 2022

(54) MONOLITHIC SEPARATION MEMBRANE STRUCTURE AND METHOD OF MANUFACTURING THE SAME

(71) Applicant: NGK INSULATORS, LTD., Nagoya (JP)

(72) Inventors: Masahiro Furukawa, Frankfurt (DE); Kei Tanaka, Inazawa (JP); Aya Miura, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 658 days.

(21) Appl. No.: 16/123,185

(22) Filed: Sep. 6, 2018

(65) Prior Publication Data

US 2019/0001280 A1    Jan. 3, 2019

Related U.S. Application Data

(63) Continuation of application No. PCT/JP2017/006382, filed on Feb. 21, 2017.

(30) Foreign Application Priority Data

Mar. 31, 2016    (JP) .............................. JP2016-071754

(51) Int. Cl.
*B01D 71/02* (2006.01)
*B01D 69/12* (2006.01)
(Continued)

(52) U.S. Cl.
CPC ......... *B01D 71/028* (2013.01); *B01D 63/066* (2013.01); *B01D 69/04* (2013.01);
(Continued)

(58) Field of Classification Search
None
See application file for complete search history.

(56) References Cited

U.S. PATENT DOCUMENTS

2003/0175496 A1* 9/2003 Bishop .................... C04B 35/10
428/312.8
2005/0107244 A1* 5/2005 Ichikawa ............. B01D 46/247
502/60
(Continued)

FOREIGN PATENT DOCUMENTS

CA    2 943 910 A1    10/2015
CN    101909728 A    12/2010
(Continued)

OTHER PUBLICATIONS

English translation of International Preliminary Report on Patentability (Chapter I) (Application No. PCT/JP2017/006382) dated Oct. 11, 2018.
(Continued)

*Primary Examiner* — Hayden Brewster
(74) *Attorney, Agent, or Firm* — Burr & Brown, PLLC

(57) ABSTRACT

The monolithic separation membrane structure includes a monolithic base, an intermediate layer and a separation membrane. The monolithic base has a plurality of filtration cells extending from a first end face to a second end face. The intermediate layer is formed on an inner surface of the filtration cells. The separation membrane is formed on an inner surface of the intermediate layer. An inner diameter not including the intermediate layer and the separation membrane of the plurality of respective filtration cells is greater than or equal to 1.0 mm to less than or equal to 2.0 mm. A partition wall thickness not including the intermediate layer and the separation membrane of the shortest portion of two adjacent filtration cells of the plurality of filtration cells is greater than or equal to 0.05 mm to less than 0.2 mm. A thickness of the intermediate layer is greater than or equal to 20 μm to less than 100 μm.

10 Claims, 4 Drawing Sheets

(51) Int. Cl.
*B01D 69/04* (2006.01)
*B01D 63/06* (2006.01)
*C04B 38/00* (2006.01)
*B01D 69/10* (2006.01)
*C04B 38/06* (2006.01)
*C04B 41/89* (2006.01)
*C04B 35/111* (2006.01)
*C04B 35/46* (2006.01)
*C04B 35/626* (2006.01)
*C04B 111/00* (2006.01)

(52) U.S. Cl.
CPC ............ *B01D 69/10* (2013.01); *B01D 69/12* (2013.01); *B01D 71/024* (2013.01); *C04B 35/111* (2013.01); *C04B 38/06* (2013.01); *C04B 41/89* (2013.01); *C04B 35/46* (2013.01); *C04B 35/6261* (2013.01); *C04B 38/0054* (2013.01); *C04B 2111/0081* (2013.01); *C04B 2111/00801* (2013.01); *C04B 2235/3217* (2013.01); *C04B 2235/36* (2013.01)

(56) References Cited

U.S. PATENT DOCUMENTS

| | | |
|---|---|---|
| 2009/0000475 A1 | 1/2009 | Fekety et al. |
| 2010/0072127 A1 | 3/2010 | Ichikawa et al. |
| 2010/0251888 A1 | 10/2010 | Fekety et al. |
| 2011/0237423 A1* | 9/2011 | Kikuchi ................ C01B 39/04 502/64 |
| 2012/0074061 A1 | 3/2012 | Teranishi et al. |
| 2014/0014574 A1 | 1/2014 | Teranishi et al. |
| 2014/0021129 A1 | 1/2014 | Teranishi et al. |
| 2015/0008178 A1 | 1/2015 | Miyahara et al. |

FOREIGN PATENT DOCUMENTS

| | | |
|---|---|---|
| CN | 103459007 A | 12/2013 |
| JP | 2001-269921 A1 | 10/2001 |
| JP | 2010-532259 A1 | 10/2010 |
| JP | 2014-046285 A1 | 3/2014 |
| JP | 5599785 B2 | 10/2014 |
| WO | 2009/001970 A1 | 12/2008 |
| WO | 2010/134514 A1 | 11/2010 |
| WO | 2012/128218 A1 | 9/2012 |
| WO | 2013/147272 A1 | 10/2013 |

OTHER PUBLICATIONS

International Search Report and Written Opinion (Application No. PCT/JP2017/006382) dated Apr. 11, 2017.
Japanese Office Action (Application No. 2018-508583) dated Aug. 11, 2020 (with English translation).
Chinese Office Action (Application No. 201780008590.4) dated Aug. 28, 2020 (with English translation).
German Office Action (with English translation), German Application No. 11 2017 001 786.6, dated Mar. 9, 2022 (10 pages).

* cited by examiner

MONOLITHIC SEPARATION MEMBRANE STRUCTURE AND METHOD OF MANUFACTURING THE SAME

TECHNICAL FIELD

The present invention relates to a monolithic separation membrane structure.

BACKGROUND ART

In a typical monolithic separation membrane structure that is provided with a monolithic base that includes a plurality of cells, an intermediate layer that is formed on an inner surface of each cell, and a separation membrane that is formed on an inner surface of the intermediate layer, a technique has been proposed to inhibit a reduction in the strength of the monolithic separation membrane structure that results after high-temperature alkali processing by defining the interrelationship of the thickness of the intermediate layer and the partition wall thickness of the substrate between two cells (reference is made to PCT Laid Open Application 2012/128218).

In PCT Laid Open Application 2012/128218, the thickness of the intermediate layer is preferably greater than or equal to 100 μm and less than or equal to 500 μm, and the partition wall thickness of the substrate is preferably greater than or equal to 0.51 mm and less than or equal to 1.55 mm.

In this context, Specification of Japanese Patent No. 5599785 discloses that the partition wall thickness is preferably greater than or equal to 0.2 mm in order to suppress large deformation of the monolithic base as a result of firing during manufacture therefore resulting in closure of cells.

SUMMARY OF THE INVENTION

However, a further reduction in the weight and/or increase in the compactness of the monolithic separation membrane structure may be desirable in response to a use of the monolithic separation membrane structure.

The present invention is proposed in light of the situation described above, and has the purpose of providing a monolithic separation membrane structure that enables a reduction in weight and/or an increase in compactness while maintaining permeation performance.

The monolithic separation membrane structure according to the present invention includes a monolithic base, an intermediate layer and a separation membrane. The monolithic base has a plurality of filtration cells extending from a first end face to a second end face. The intermediate layer is formed on an inner surface of the filtration cells. The separation membrane is formed on an inner surface of the intermediate layer. An inner diameter not including the intermediate layer and the separation membrane of the plurality of respective filtration cells is greater than or equal to 1.0 mm to less than or equal to 2.0 mm. A partition wall thickness not including the intermediate layer and the separation membrane of the shortest portion of two adjacent filtration cells of the plurality of filtration cells is greater than or equal to 0.05 mm to less than 0.2 mm. A thickness of the intermediate layer is greater than or equal to 20 μm to less than 100 μm.

Effect of Invention

The present invention enables the provision of a monolithic separation membrane structure that enables a reduction in weight and/or increase in compactness while maintaining permeation performance.

DESCRIPTION OF EMBODIMENTS

Figure 1:
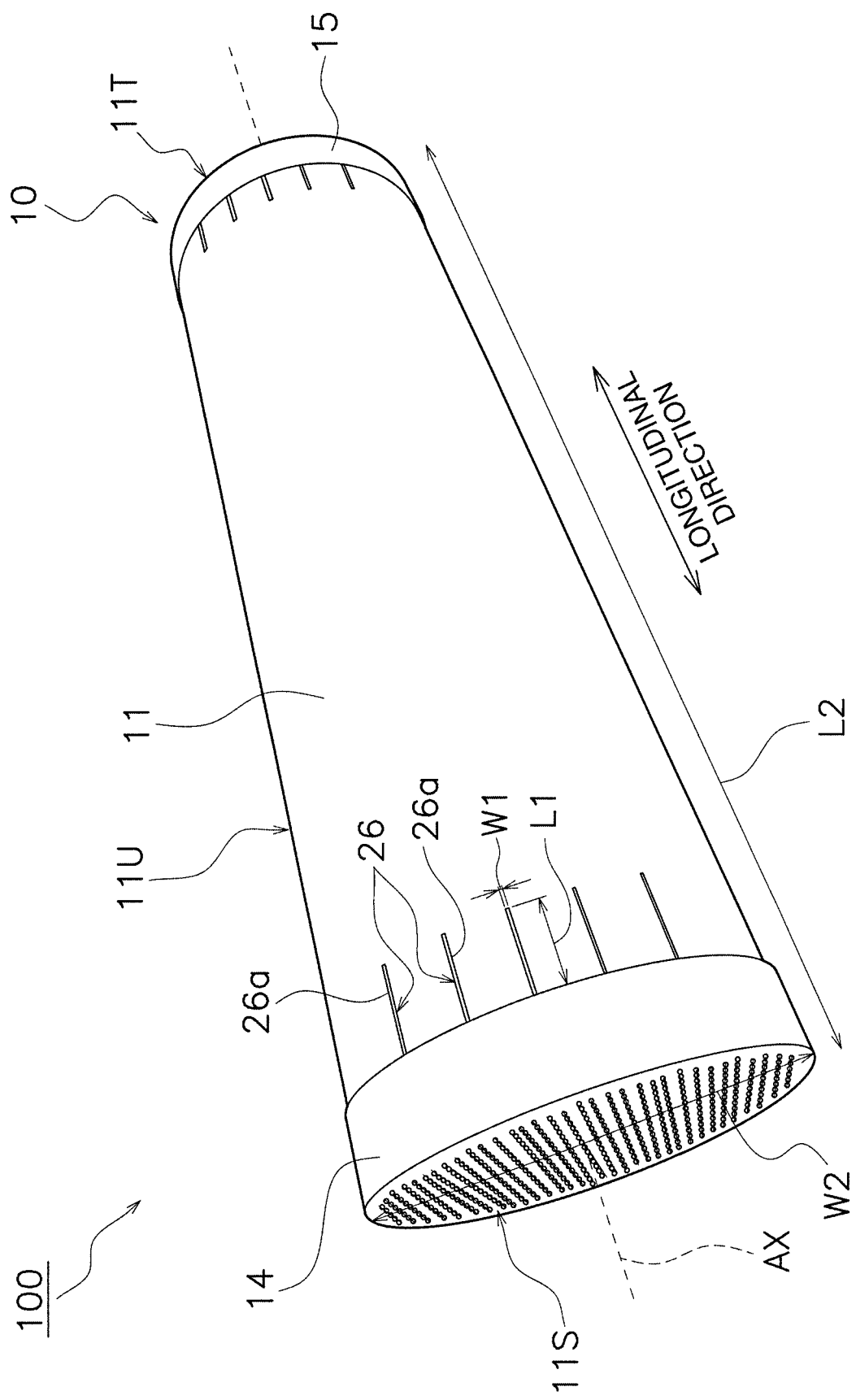
FIG. 1 is a perspective view illustrating a monolithic separation membrane structure.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, the term "monolithic" is a concept that denotes a shape that includes a plurality of cells penetrating in a longitudinal direction, and includes a honeycomb shape.

Configuration of Monolithic Separation Membrane Structure 100

Figure 2:
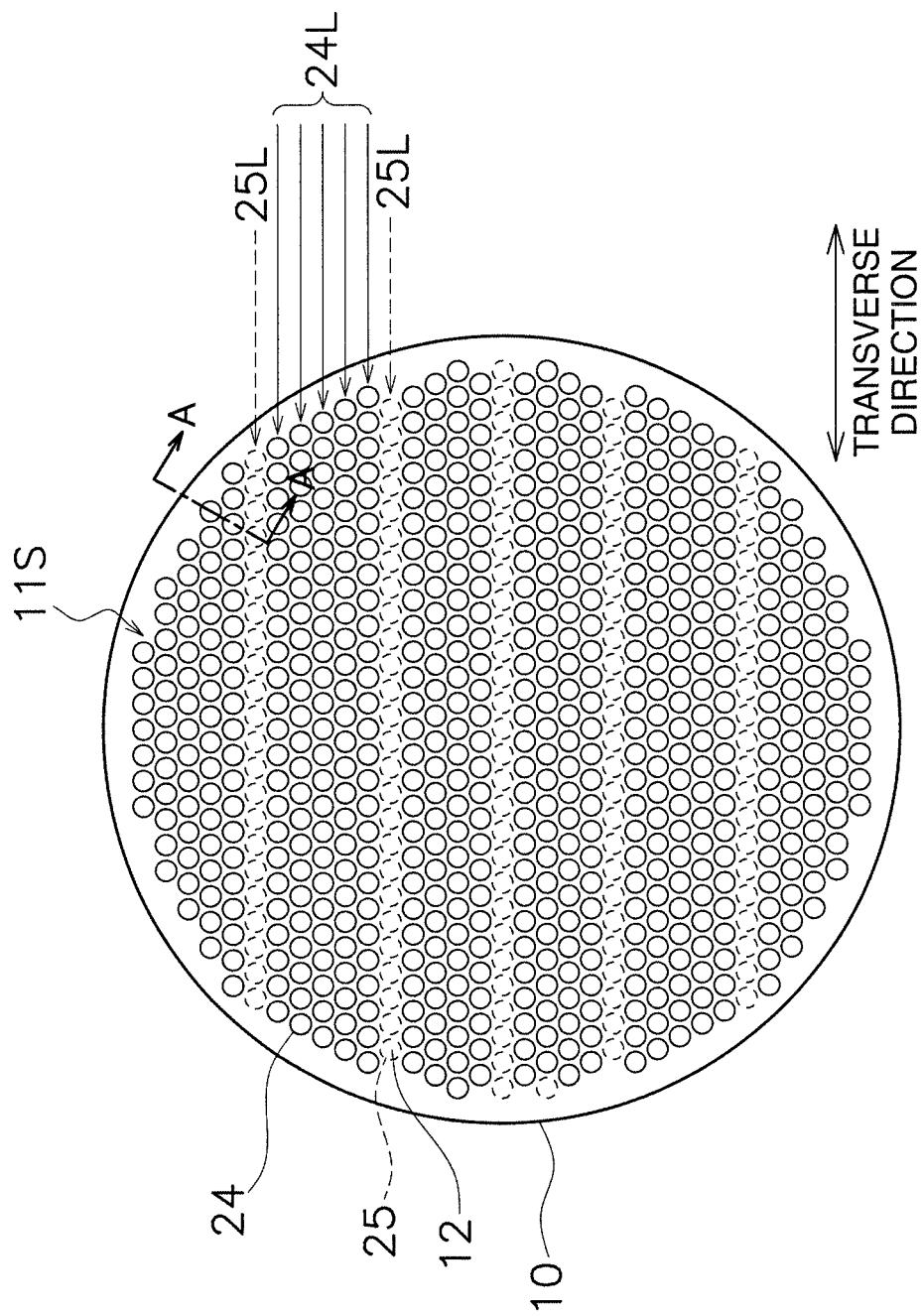
FIG. 2 illustrates a plan view of a first end face.
Figure 3:
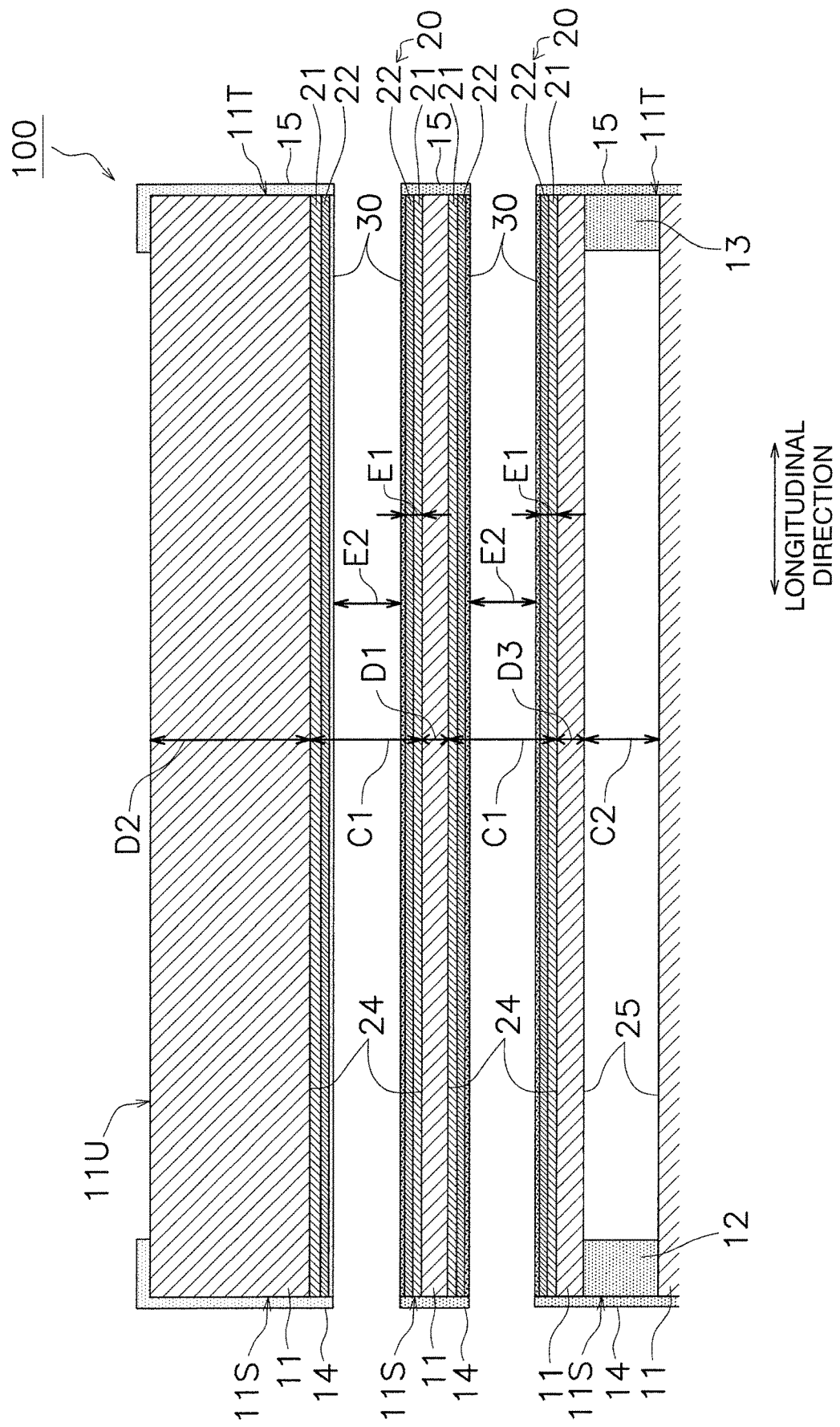
FIG. 3 is a sectional view along A-A in FIG. 2.

FIG. 1 is a perspective view illustrating a monolithic separation membrane structure 100. FIG. 2 is a plan figure of a first end face 11S. FIG. 3 illustrates a sectional view along the line A-A of FIG. 2.

Overview of Structure

The monolithic separation membrane structure 100 illustrated in FIG. 1 to FIG. 3 is a ceramic porous body, and is provided with a monolithic base 10 that has both end faces 11S, 11T and an outer peripheral face 11U. The outer shape of the monolithic base 10 is cylindrical. The monolithic base 10 includes a plurality of filtration cells 24 and a plurality of water collecting cells 25. The plurality of filtration cells 24 is formed in a row (generally the crosswise direction in FIG. 1) to penetrate from one end face 11S to another end face 11T. The plurality of water collecting cells 25 is formed in a row (generally the crosswise direction in FIG. 1) to penetrate from one end face 11S to another end face 11T.

The cross sectional shape of the filtration cells 24 and water collecting cells 25 in the monolithic separation membrane structure 100 is circular. The filtration cells 24 open onto both end faces 11S, 11T. The opening of both end faces 11S, 11T in the water collecting cells 25 is plugged with a plugging member 12, 13, and a discharge channel 26 is provided so that the water collecting cells 25 communicate with an external space. Furthermore, an intermediate layer 20 and a separation membrane 30 are disposed on an inner wall face of the filtration cells 24 that have a circular cross sectional shape.

The monolithic separation membrane structure 100 forms two discharge channels 26 in proximity to both end faces 11S, 11T for each row 25L of the plurality of communicating water collecting cells 25. There are 5 rows of water collecting cells 25 in the monolithic separation membrane structure 100, and at each row, the discharge channel 26 connects the plurality of water collecting cells 25 and opens onto an outer peripheral face 11U of the monolithic base 10. In FIG. 1 to FIG. 3, since there are 5 rows of water collecting cells rows 25L in the monolithic separation membrane structure 100, the number of discharge channels 26 in the monolithic separation membrane structure 100 at both ends is 10.

The above configuration enables efficient separation from a mixed fluid (fluid mixture or gaseous mixture) that flows into the filtration cells 24 of a component that has permeated through the filtration cells 24. More specifically, a permeation component that permeates through the separation membrane 30 of the inner surface of the filtration cells 24 permeates through the intermediate layer 20, then passes sequentially into the porous body that configures the partition wall inner portion of the monolithic base 10, and is discharged from the outer partition wall 11U. However, the length of the permeation distance that must be traversed in the partition wall (porous body) increases in proportion to an inner position for a filtration cell 24. In this regard, the provision of the wall collecting cells 25 and the discharge channels 26 enables continuous flow in the partition wall between existing filtration cells 24, and facilitates discharge to an external space through the discharge channels 26 and the water collecting cells 25 with little pressure loss.

A mixed fluid in the monolithic separation membrane structure 100 directly flows from the porous portion of both end faces 11S, 11T of the monolithic base 10. Therefore seal portions 14, 15 are provided to cover the porous body of both end faces 11S, 11T of the monolithic base 10 in which the mixed fluid flows in order to prevent discharge without separation by the separation membrane 30 that is formed on an inner wall face of predetermined filtration cells 24. Both ends of the filtration cells 24 provided with the separation membrane 30 are connected to and open on the seal portions 14, 15. The inner surfaces of the plurality of respective filtration cells 24 include sequential formation of the intermediate layer 20 and the separation membrane 30.

Optimal Configuration for Respective Structures

The monolithic base 10 is formed in a cylindrical shape. The length of the monolithic base 10 in a longitudinal direction may be configured as 100 to 2000 mm. The diameter of the monolithic base 10 may be configured as 30 to 220 mm. The monolithic base 10 may also be an elliptic cylinder or a polygonal prism.

The inner diameter C1 of the filtration cells 24 not including the intermediate layer 20 and the separation membrane 30 is greater than or equal to 1.0 mm and less than or equal to 2.0 mm. A configuration in which the inner diameter C1 is configured to be less than or equal to 2.0 mm enables densification of the filtration cells 24, an increase in the total surface area of the separation membrane 30 and therefore a reduction in the weight and/or an increase in the compactness of the monolithic separation membrane structure 100. From the point of view of increasing the total surface area, although densification of the filtration cells 24 is enabled as the inner diameter C1 is reduced, since slurry blockage may result during film formation of the intermediate layer 20, the actual diameter may be configured to greater than or equal to 1.0 mm. From the point of view that the total surface area can be increased while inhibiting slurry blockage during manufacture, the inner diameter C1 is preferably greater than or equal to 1.10 mm and less than or equal to 1.85 mm.

The partition wall thickness D1 not including the intermediate layer 20 and the separation membrane 30 of the shortest portion of two adjacent filtration cells 24 is greater than or equal to 0.05 mm to less than 0.2 mm. A configuration in which the partition wall thickness D1 of the monolithic base 10 is configured to be less than 0.2 mm enables densification of the filtration cells 24, and an increase in the total surface area of the separation membrane 30. From the point of view of increasing the total surface area, although densification of the filtration cells 24 is enabled as the partition wall thickness D1 is reduced, since strength will be insufficient if the thickness is too small and the inner wall structure of the monolithic base 10 will collapse during manufacture and/or use, the actual thickness may be configured to be greater than or equal to 0.05 mm. From the point of view of increasing the total surface area while inhibiting collapse of the inner wall structure of the monolithic base 10, the partition wall thickness D1 is preferably greater than or equal to 0.10 mm and less than or equal to 0.18 mm.

In the present embodiment, although all positions between adjacent filtration cells 24 are configured with a uniform partition wall thickness D1, a plurality of types of partition wall thickness D1 may be present. In a configuration in which a plurality of types of partition wall thickness D1 is present, it is preferred that the partition wall thickness D1 at greater than or equal to 33% of positions of the total of all positions is greater than or equal to 0.05 mm and less than 0.2 mm.

The thickness (outer wall thickness D2) of the shortest portion of the outer peripheral face 11U and the filtration cells 24 that are positioned on the outermost periphery of the plurality of filtration cells 24 not including the intermediate layer 20 and the separation membrane 30 is preferably greater than or equal to 10 times and less than or equal to 30 times the partition wall thickness D1 of the filtration cells 24. A configuration in which the outer wall thickness D2 is greater than or equal to 10 times the partition wall thickness D1 enables sufficient maintenance of strength in relation to an outer force applied during assembly into a device or the like. On the other hand, when the outer wall thickness D2 is arbitrarily increased, the effect of increasing compactness and/or decreasing weight will be cancelled out, and therefore it is preferred that the outer wall thickness D2 is less than or equal to 30 times the partition wall thickness D1. From the point of view of withstanding an external force during assembly for the like, the compaction strength in a longitudinal direction of the monolithic separation membrane structure 100 is preferably greater than or equal to 5 MPa.

As illustrated in FIG. 2, when the first end face 11S is viewed in plan, the plurality of filtration cells 24 forms a plurality of filtration cell rows 24L. The plurality of respective filtration cell rows 24L includes two or more filtration cells 24 that are aligned along a transverse direction (example of a predetermined direction) that is orthogonal to the longitudinal direction. In the present embodiment, 28 filtration cell rows 24L are formed that align 7 to 29 filtration cells 24 in each row. However, the number of filtration cells 24 in each row or the number of rows of the filtration cell rows 24L may be suitably varied.

As illustrated in FIG. 3, the water collecting cells 25 are formed along the longitudinal direction of the monolithic base 10. Both end faces of the water collecting cells 25 are plugged by the first plugging member 12 and the second plugging member 13 and thereby do not open onto the first seal portion 14 and the second seal portion 15. The intermediate layer 20 and the separation membrane 30 are not formed on an inner surface of the water collecting cell 25.

An inner diameter C2 of the water collecting cells 25 may be configured as greater than or equal to 0.5 mm and less than or equal to 3.0 mm. From the point of view of increasing the total surface area, although densification of the filtration cells 24 is enabled as the inner diameter C2 is reduced, from the point of view of reducing the permeation resistance of a permeation separation component, since the performance of the inner diameter C2 increases with increasing size, C2 may be suitably selected in response to the use conditions of the monolithic separation membrane structure 100. From the point of view of facilitating manufacture, the inner diameter C2 is preferably greater than or equal to 1.0 mm and less than or equal to 2.0 mm. The inner diameter C2 may be the same or different from the inner diameter C1 of the filtration cells 24 that does not include the intermediate layer 20 and the separation membrane 30.

The partition wall thickness D3, not including the intermediate layer 20 and the separation membrane 30, of the shortest portion of adjacent filtration cells 24 and water collecting cells 25 is greater than or equal to 0.05 mm to less than 0.2 mm. A configuration in which the partition wall thickness D3 is configured to be less than 0.2 mm enables an increase in the total surface area. From the point of view of increasing the total surface area, although densification of the filtration cells 24 is enabled as the partition wall thickness D3 is reduced, since strength will be insufficient if the diameter is too small and the inner wall structure of the monolithic base 10 will collapse during manufacture and/or use, the actual diameter may be configured to greater than or equal to 0.05 mm. From the point of view that the total surface area can be increased while inhibiting collapse of the inner wall structure of the monolithic base 10, the partition wall thickness D3 is preferably greater than or equal to 0.1 mm and less than or equal to 0.18 mm. Furthermore, although not shown in the drawings, an interval between adjacent water collecting cells 25 may be configured to be greater than or equal to 0.05 mm and less than 0.2 mm, and more preferably greater than or equal to 0.1 mm and less than or equal to 0.18 mm.

In the present embodiment, although all positions between adjacent filtration cells 24 and water collecting cells 25 are configured with a uniform partition wall thickness D3, a plurality of types of partition wall thickness D3 may be present. In a configuration in which a plurality of types of partition wall thickness D3 is present, it is preferred that the partition wall thickness D3 at greater than or equal to 33% of positions of the total of all positions is greater than or equal to 0.05 mm and less than 0.2 mm.

As illustrated in FIG. 2, when the first end face 11S is viewed in plan, the plurality of water collecting cells 25 forms a plurality of water collecting cell rows 25L. The plurality of respective water collecting cell rows 25L includes two or more water collecting cells 25 that are aligned along a transverse direction (example of a predetermined direction). In the present embodiment, 5 rows of water collecting cell rows 25L are disposed at mutually separated positions, and although 22 to 29 water collecting cells 25 are aligned in each row, the number of water collecting cells 25 in each row or the number of rows of the water collecting cell rows 25L may be suitably varied.

4 or 5 rows of filtration cell rows 24L are disposed between 2 rows of water collecting cell rows 25L. That is to say, 4 or 5 rows of filtration cell rows 24L are disposed on both sides of one row of the water collecting cell rows 25L. The number of rows of filtration cell rows 24L disposed between 2 rows of water collecting cell rows 25L ("number of filtration cell rows between water collecting cell rows") is preferably greater than or equal to 2 rows and less than or equal to 9 rows. A configuration in which the number of filtration cell rows between water collecting cell rows is less than or equal to 9 rows enables a reduction in the distance of flow of a permeation component from a filtration cell 24 that is in an innermost position to a water collecting cell 25 of the filtration cells 24 that are positioned between the water collecting cell rows 25L.

In this context, from the point of view of inhibiting rate limiting flow of a permeation component, the smaller the number of filtration cell rows between water collecting cell rows the better. However, since the number of water collecting cells 25 is relatively increased as that number is decreased, the number of filtration cells 24 is thereby reduced and the total surface area of the separation membrane 30 is decreased. From the point of view of avoiding an excessive decrease in the total surface area of the separation membrane 30 by more than a predetermined amount, it is preferred that the number of filtration cell rows between water collecting cell rows is greater than or equal to 2 rows. It is particularly preferred that the number of filtration cell rows between water collecting cell rows is greater than or equal to 4 rows and less than or equal to 6 rows from the point of view of reducing pressure loss in relation in relation to a permeation component from a filtration cell 24 until reaching a water collecting cell 25 and of maintaining a high total surface area for the separation membrane 30.

As shown in FIG. 1, the discharge channels 26 include an opening 26a that opens onto the outer peripheral face 11U. A width W1 of the opening 26a in a peripheral direction about an axial center AX of the monolithic base 10 may be configured as greater than or equal to 10% and less than or equal to 80% of the inner diameter of a water collecting cell 25, and is preferably greater than or equal to 16% from the point of view of increasing the surface area of the opening 26a and reducing pressure loss in relation to a permeation component and less than or equal to 50% from the point of view of facilitating cutting operations during manufacturing.

The sum total of the length L1 (that is to say, L1+L1) of the two openings 26a in a longitudinal direction of the monolithic base 10 may be configured as greater than or equal to 3.3% and less than or equal to 40% of the total length of the monolithic base 10 in a longitudinal direction, is preferably greater than or equal to 9% of the total length L2 from the point of view of increasing the surface area of the opening 26a and reducing pressure loss in relation to a permeation component, and is preferably less than or equal to 17% from the point of view of the mechanical strength of the monolithic separation membrane structure 100. In this manner, the permeation rate of a permeation component can be enhanced since it is possible to reduce the pressure loss in relation to a permeation component (fluid) that is accumulated in the water collecting cells 25.

In this context, the opening 26a may be provided at only one of the end faces or may be provided by drilling along the longitudinal direction in addition to both end faces. From the point of view of uniform discharge of the permeation component, provision at least at both end faces is preferred. When a plurality of openings is provided, each opening length may be equal or may be different. The number, shape and position of the discharge channels 26 may be the same or may be different in all water collecting cell rows 25L.

The first plugging member 12 and the second plugging member 13 are disposed in all water collecting cells 25. The first plugging member 12 and the second plugging member 13 are arranged in an opposed configuration at both end faces of each water collecting cell 25. The first plugging member 12 and the second plugging member 13 may be configured by use of a porous material. The fill depth of the first plugging member 12 and the second plugging member 13 may be configured to about 5 to 20 mm.

The first seal portion 14 covers a portion of the outer peripheral face 11U and the whole surface of the first end face 11S. The first seal portion 14 suppresses infiltration of a mixed fluid into the first end face 11S. The first seal portion 14 is formed so that the inflow port of the filtration cells 24 is not blocked. The first seal portion 14 covers the first plugging member 12. The material that configures the first seal portion 14 includes glass or metal, rubber, resin, or the like, with glass being preferred in light of its consistency with the coefficient of thermal expansion of the monolithic base 10.

The second seal portion 15 covers a portion of the outer peripheral face 11U and the whole surface of the second end face 11T. The second seal portion 15 suppresses infiltration of a mixed fluid into the second end face 11T. The second seal portion 15 is formed so that the inflow port of the filtration cells 24 is not blocked. The second seal portion 15 covers the second plugging member 13. The second seal portion 15 may be configured from the same material that configures the first seal portion 14.

Monolithic Base 10

Next, the monolithic base 10 will be described.

The monolithic base 10 contains an aggregate and a binding material. The aggregate includes use of alumina, silicon carbide, titania, mullite, selben, cordierite, or the like. The binding material is a non-organic oxide material that melts at a lower temperature than the aggregate component and bonds the aggregate together. The binding material includes use of alumina or a silica-based non-organic oxide material that contains alkali metals, alkali earth metals or the like.

The content ratio of the aggregate in the monolithic base 10 may be configured as greater than or equal to 60 volume % and less than or equal to 80 volume %, and is preferably greater than or equal to 65 volume % and less than or equal to 75 volume %. The content ratio of the aggregate may be measured using an Archimedes method.

The oxide material used as the binding material is a glass material that includes at least one of an alkali metal or an alkali earth metal, silicon (Si) and aluminum (Al). The alkali metal includes use of at least one of sodium (Na), potassium (K) and lithium (Li). The oxide material may contain an alkali metal as an alkali metal oxide. The alkali earth metal includes use of at least one of magnesium (Mg), calcium (Ca), strontium (Sr) and barium (Ba). The oxide material may contain an alkali earth metal as an alkali earth metal oxide. The oxide material preferably includes both of an alkali metal and an alkali earth metal. The oxide material may contain Si as $SiO_2$. The oxide material may contain Al as $Al_2O_3$.

The content ratio of the oxide material in the monolithic base 10 may be configured to be greater than or equal to 20 vol % and less than or equal to 40 vol %, and is preferably greater than or equal to 25 vol % and less than or equal to 35 vol %. The content ratio of the oxide containing material may be measured using an Archimedes method.

Although there is no particular limitation in relation to the porosity of the monolithic base 10, it may be configured to be greater than or equal to 25% and less than or equal to 50%, and is preferably 30% to 45%. The porosity of the monolithic base 10 may be measured using a mercury press-in method.

Although there is no particular limitation on the average pore diameter of the monolithic base 10, it may be configured as 0.1 μm to 50 μm, and from the point of view of facilitating membrane formation of the intermediate layer 20, it is preferably configured as 1 μm to 10 μm.

Intermediate Layer 20

The intermediate layer 20 is formed on an inner surface of the filtration cells 24. The intermediate layer 20 is formed in a tubular configuration.

The intermediate layer 20 contains the aggregate and a binding material. The aggregate includes use of alumina, titania, mullite, selben, cordierite, or the like. The binding material is a non-organic component that undergoes sintering solidification at a temperature at which the aggregate component does not sinter. The binding material includes use of sinterable alumina, silica, glass frits, clay minerals, sinterable cordierite, or the like.

The ratio of the binding material in the non-organic solid portion (aggregate+binding material) in the intermediate layer 20 may be configured as greater than or equal to 5 mass % and less than or equal to 42 mass %. From the point of view of imparting a high strength to the intermediate layer 20, a value of greater than or equal to 28 mass % and less than or equal to 42 mass % is preferred, and greater than or equal to 30 mass % and less than or equal to 42 mass % more preferred.

As shown in FIG. 3, the intermediate layer 20 in the present embodiment includes a first intermediate layer 21 and a second intermediate layer 22. The first intermediate layer 21 is formed on an inner surface of the filtration cells 24 of the monolithic base 10. The second intermediate layer 22 is formed on an inner surface of the first intermediate layer 21. The average pore diameter of the second intermediate layer 22 is preferably smaller than the average pore diameter of the first intermediate layer 21. For example, in a configuration in which the average pore diameter of the first intermediate layer 21 is 1 μm, the average pore diameter of the second intermediate layer 22 is may be configured as 0.1 μm.

The intermediate layer 20 is not limited to a double layer structure configured by the first intermediate layer 21 and the second intermediate layer 22, and may have a single layer structure configured by one intermediate layer having a uniform average pore diameter, or a multilayer structure configured by three or more intermediate layers having smaller average pore diameters as the separation membrane 30 is approached.

The thickness E1 of the intermediate layer 20 is greater than or equal to 20 μm and less than 100 μm. A configuration in which the thickness E1 of the intermediate layer 20 is less than 100 μm enables the surface area of the separation membrane 30 to be increased. From the point of view of increasing the surface area, smaller thicknesses E1 for the intermediate layer 20 are advantageous. Although a value of less than 100 μm is desirable, an excessively small value causes insufficient smoothness in the surface of the intermediate layer 20 and a tendency for defects. Therefore in practice, the value may be configured to greater than or equal to 20 μm. It is noted that from the point of view of maximizing the increase in the surface area of the separation membrane 30 while inhibiting the frequency of faults due to defects, the thickness E1 of the intermediate layer 20 is preferably greater than or equal to 40 μm and less than 80 μm.

Separation Membrane 30

The separation membrane 30 is formed on an inner surface of the intermediate layer 20. The separation membrane 30 is formed in a tubular configuration. The separation membrane 30 enables permeation of a permeation separation component contained in the mixed fluid. The separation function of the monolithic separation membrane structure 100 is displayed with reference to the separation membrane 30. The average pore diameter of the separation membrane 30 may be suitably determined based on a required filtration function and separation function. For example, the average pore diameter of the separation membrane 30 may be configured for example to 0.0003 µm (0.3 nm) to 1.0 µm. However there is no particular limitation in this regard. The average pore diameter of the separation membrane 30 may be measured with reference to an airflow method as disclosed in ASTM F316.

The separation membrane 30 may use a known MF (microfiltration) membrane, UF (ultrafiltration) membrane, gas separation membrane, pervaporation membrane or vapor permeable membrane, or the like. More specifically, the separation membrane 30 includes use of a ceramic membrane (for example, reference is made to Japanese Patent Application Laid-Open No. 3-267129, Japanese Patent Application Laid-Open No. 2008-246304), a carbon monoxide separation membrane (for example, reference is made to Japanese Patent No. 4006107), a helium separation membrane (for example, reference is made to Japanese Patent No. 3953833), a hydrogen separation membrane (for example, reference is made to Japanese Patent No. 3933907), a carbon membrane (for example, reference is made to Japanese Patent Application Laid-Open No. 2003-286018), a zeolite membrane (for example, reference is made to Japanese Patent Application Laid-Open No. 2004-66188), a silica membrane (for example, reference is made to the pamphlet of PCT Laid Open Application 2008/050812), an organic-inorganic hybrid silica membrane (for example, reference is made to Japanese Patent Application Laid-Open No. 2013-203618), and p-tolyl group-containing silica (for example, reference is made to Japanese Patent Application Laid-Open No. 2013-226541) or the like.

The inner diameter E2 of the separation membrane 30 may be configured to be greater than or equal to 0.8 mm or less than or equal to 1.96 mm. From the point of view of facilitating flow of a mixed fluid that is the object for separation and of increasing the total surface area of the separation membrane 30, the inner diameter E2 is preferably greater than or equal to 1.2 mm and less than or equal to 1.8 mm. The inner diameter E2 is the maximum inner diameter of the separation membrane 30. A configuration that calculates the sum of the total surface area of the separation membrane 30 in each filtration cell 24 is the "membrane surface area" of the monolithic separation membrane structure 100.

As stated above, in the monolithic separation membrane structure 100 according to the present embodiment, the inner diameter C1 of the filtration cell 24 is greater than or equal to 1.0 mm or less than or equal to 2.0 mm, the partition wall thickness D1 between adjacent filtration cells 24 is greater than or equal to 0.05 mm and less than 0.2 mm, the thickness E1 of the intermediate layer 20 is greater than or equal to 20 µm and less than 100 µm. Therefore, since it is possible to increase the total surface area of the separation membrane 30, the surface area of the separation membrane 30 per unit volume of the monolithic separation membrane structure 100 can be configured to be greater than or equal to 1 m²/L, and the surface area of the separation membrane 30 per unit weight of the monolithic separation membrane structure 100 can be configured to greater than or equal to 0.5 m²/kg. As a result, it is possible to increase the compactness and/or reduce the weight of the monolithic separation membrane structure 100 while maintaining the permeation performance of the monolithic separation membrane structure 100.

Method of Manufacturing Monolithic Separation Membrane Structure 100

Firstly, the starting materials for the monolithic base 10 are extrusion molded, for example, using a vacuum extruder, to obtain a monolithic green body having filtration cells 24 and water collecting cell 25. The starting material for the monolithic base 10, for example, includes a clay that is prepared by adding water, a dispersant and an organic binder such as methyl cellulose to aggregate particles and an inorganic binding material, and then kneading. The aggregate particles, specifically, include suitable use of at least one ceramic material selected from the group consisting of alumina, silicon carbide, mullite, selben, and cordierite.

At that time, the average particle diameter of the aggregate particles that are used may be greater than or equal to 5 µm and less than 40 µm. In a configuration of greater than 40 µm, when extruding a monolithic base 10 having the thin partition wall thickness of the present invention, it may be the case that the clay blocks the extrusion nozzle. On the other hand, in a configuration of less than or equal to 5 µm, this is because it is not possible to maintain the structure of the monolithic base 10 due to insufficient material strength. It is noted that from the point of view of enabling superior extrusion molding of the monolithic base 10 exhibiting the thin partition wall thickness in the present invention, the average particle size of the aggregate particles is more preferably greater than or equal to 10 µm and less than or equal to 25 µm.

The oxide material used as the inorganic binding material is a glass material that contains at least one of an alkali metal and an alkaline earth metal, and silicon (Si) and aluminum (Al). The alkali metal includes use of at least one of sodium (Na), potassium (K) and lithium (Li). The alkaline earth metal includes use of at least one of magnesium (Mg), calcium (Ca), strontium (Sr) and barium (Ba). The oxide material preferably includes both an alkali metal and an alkaline earth metal. The oxide material may contain Si as $SiO_2$. The oxide material may include Al as $Al_2O_3$. More specifically, a natural starting material such as kaolin, talc, feldspar, dolomite, clay, and silica sand may be used, an industrial material such as fused alumina, silica, and calcium carbonate may be used, or a mixture of such materials may be used.

The average particle diameter of the inorganic binding material that is used may be configured to be greater than or equal to 0.1 µM and less than or equal to 10 µm. In a configuration of less than or equal to 10 µm, a high-strength monolithic base 10 can be provided that tends to melt during firing and/or exhibits high dispersion between aggregate particles. From the point of view of enabling high dispersion among aggregate particles, although smaller average particle diameters of the inorganic binder are advantageous, since there is a tendency for cost increases to be associated with finer starting materials, the particle diameter may be configured as greater than or equal to 0.1 µm. From the point of view of use together with aggregate particles as described above that have an average particle diameter of greater than or equal to 10 µm and less than or equal to 25 µm, the average particle diameter of the inorganic binding material is more preferably greater than or equal to 0.5 µm and less than or equal to 5 µm.

Then, the resulting monolithic green body is fired for example at 900 to 1600 degrees C. to obtain a monolithic base, a discharge channel 26 is formed to communicate from one position of the outer peripheral face through the water collecting cell 25 to another position. Thereby a monolithic base is obtained that forms the discharge channel 26. The cutting operation for the discharge channel can be formed by cutting with a band saw or disk cutter, a wire saw or the like provided with a diamond abrasive while applying a laser reference to both end faces at which the discharge channel 26 will be formed. During the cutting operation, friction and/or heat production can be reduced by use of a solvent such as water or the like since the life of the cutting tool is reduced as a result of heat production and/or loss of the diamond abrasive due to friction between the monolithic base and the cutting tool.

A width W1 of the discharge channel 26 may be suitably configured by selecting a thickness for a cutting tool such as a band saw or disk cutter, a wire saw, or the like, and then configuring a thickness by subtracting the cutting allowance for the target width W1. For example, when the target width W1 for the discharge channel 26 is 0.8 mm, a diamond disk can be selected that has a thickness of 0.6 mm less the cutting allowance. From the point of view of facilitating the cutting operation, the width W1 is more preferably less than or equal to 50% of the inner diameter C2 of the water collecting cell 25 that forms the discharge channel 26. This is due to the fact that when the ratio of the width W1 to the inner diameter C2 is large, the partition wall between the filtration cells 24 and the water collecting cells 26 may collapse.

A suitable length L1 for the discharge channel 26 may be selected for cutting of the discharge channel 26 by adjusting the distance of the cut that progresses in a longitudinal direction. The cutting rate for this cut is suitably selected by taking into account the strength of the monolithic base, the resulting heat or the like, and it may be configured as 0.1 to 50 mm/sec. A value of less than or equal to 0.1 mm/sec is not preferred since the cutting time becomes excessively long, and a value of greater than or equal to 50 mm/sec is not preferred since excessive strain is applied to the monolithic base that may result in collapse. From a point of view of avoiding a reduction in the life of the cutting tool and facilitating the processing operation, the cutting rate is preferably 0.5 to 10 mm/sec.

Depending on the cutting tool that is used, the cutting surface of the discharge channel 26 is not linear, and in particular when a disk cutter is used, the inner portion may be fan-shaped. In this configuration, the opening length that is formed on the outer peripheral face 11U is configured as the length L1 of the opening 26a. Furthermore, suitable discharge of a permeation component is configured by drilling the discharge channel by use of a drill, router, water cutter, or the like into a body portion other than both end faces.

Next, in the resulting monolithic base, a plugging material in the form of a slurry is filled into the space, that reaches the discharge channel 26, from both end faces of the water collecting cells formed by cutting the discharge channel and therefore obtain a plugging material-filled monolithic base.

More specifically, a film (masking) such as polyester or the like is applied to both end faces of the monolithic base, and a hole is drilled into the film with reference to laser irradiation or the like at the portion corresponding to the discharge channel 26. Then, the end face of the monolithic base with the film applied thereto is pressed into a container filled with the plugging material (slurry), and then filled by application of a pressure for example of 200 kg by use of an air cylinder or the like to thereby obtain a plugging material-filled monolithic base. The plugging material-filled fired monolithic base is fired for example at 900 to 1400 degrees C. to thereby obtain a plugging material-filled monolithic base.

Then, an intermediate layer 20 is formed as a foundation for the separation membrane 30 on an inner wall face of the filtration cells 24 of the plugging material-filled monolithic base. An intermediate layer slurry is firstly prepared in order to form the intermediate layer 20 (film formation). The intermediate layer slurry can be prepared by adding 400 parts by mass of water to 100 parts by mass of a ceramic starting material such as alumina, mullite, titania, cordierite, or the like that have a desired particle diameter (for example, an average particle diameter of 1 µm to 5 µm).

The intermediate layer slurry may include addition of a membrane inorganic binding material in order to increase the film strength after sintering. The membrane inorganic binding material may include use of clay, kaolin, a titania sol, silica sol, glass frit, or the like. The addition amount of the membrane inorganic binding material is preferably 5 to 42 parts by mass in light of film strength. The intermediate layer slurry is deposited on an inner wall face of the filtration cells 24 (by use of a device as disclosed for example in Japanese Patent Application Laid-Open No. 61-238315), and after drying, the intermediate layer 20 is formed by sintering for example at 900 to 1050 degrees C.

The intermediate layer 20 may be formed into a film as a separate plurality of layers such as the intermediate layer 21 and the intermediate layer 22 by use of a plurality of types of slurry that vary the average particle diameter. In such a configuration, the plurality of layers of the intermediate layer 20 can be provided for example as in the monolithic separation membrane structure 100 of the present invention. When forming films for a plurality of layers in the intermediate layer 20, the film forming process and the firing process may be executed in relation to each intermediate layer, or after repeating a plurality of film forming processes, an integral firing step may be performed. The effect of unevenness in the surface of the monolithic base may be reduced by the intermediate layer 20 as a result of providing the separation membrane 30 on the intermediate layer 20. As a result, even when the separation membrane 30 is formed as a thin film, the occurrence of defects can be reduced. That is to say, it is possible to obtain a monolithic separation membrane structure 100 that exhibits high flux, low cost, and high performance.

After coating a glass starting material slurry by spray atomization or brushing onto an end face of the resulting monolithic base with the intermediate layer attached thereto, a green body for the first and second seal portions 14, 15 may be formed by firing for example at 800 to 1000 degrees C. The glass starting material slurry for example can be adjusted by mixing an organic binder and water into glass frits. Although a configuration has been described in which the material for the first and seal portions 14 and 15 is glass, as long as the first and second seal portions 14 and 15 prevent passage of the separation fluid that is discharged from the discharge channel 26 after separation from the mixed fluid that is the object of the separation process, it is possible to use for example a silicon resin or a teflon (registered trademark) resin, or the like. In a configuration in which the intermediate layer 20 has a multilayered structure, a green body for the first and second seal portions 14 and 15 may be formed during formation of the intermediate layer 20.

Next, a separation membrane 30 is formed on an inner surface of the intermediate layer 20. In this context, when the average pore diameter of the separation membrane 30 is less than 1 nm and when there is a requirement to form a thinner film in order to reduce pressure loss, it is preferred to further provide a foundation layer between the intermediate layer 20 and the separation layer 30. For example, on the intermediate layer 20, it is preferred that a titania sol is obtained by hydrolysis of titanium isopropoxide in the presence of nitric acid, diluted with water to prepare a foundation layer sol, and then after the prepared foundation layer sol has flowed onto the inner wall surface of a predetermined cell of the monolithic base provided with the intermediate layer, thermal treatment is performed for example at 400 to 500 degrees C. to form a film of the foundation layer.

Figure 4:
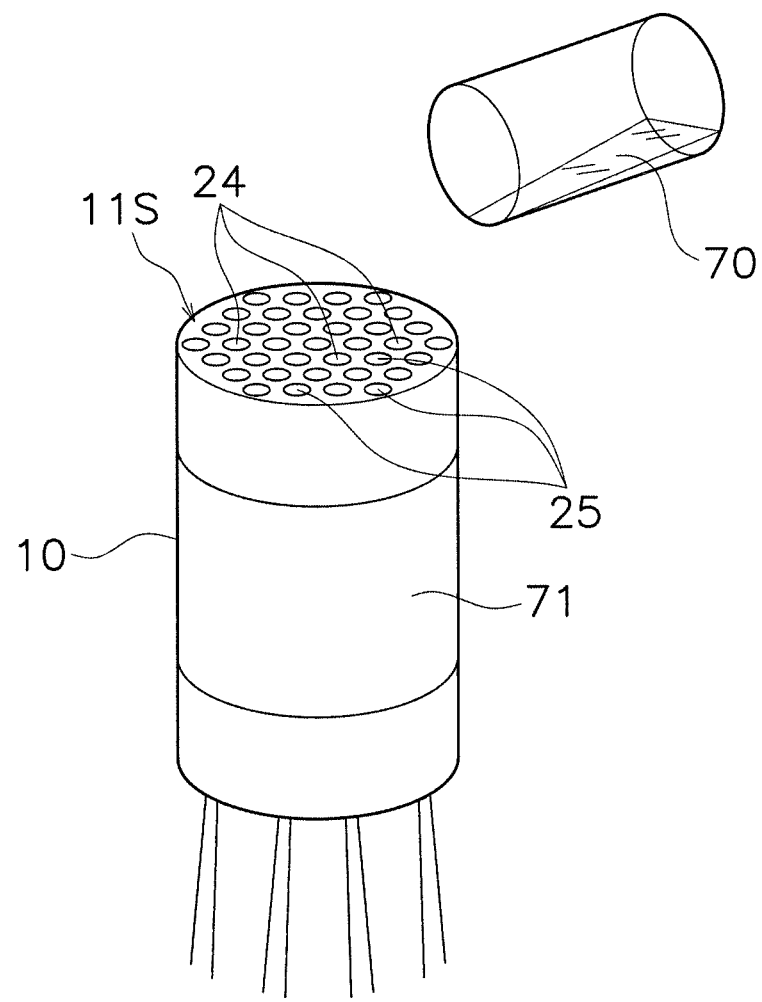
FIG. 4 is a schematic view illustrating an example of a configuration of inflow of a precursor solution for the separation membrane during a manufacturing process.

When the separation membrane 30 is a silica membrane, a precursor solution (silica sol) can be prepared as a sol by hydrolysis of an organic silane compound in the presence of nitric acid and then diluting for example with an organic solvent such as ethanol, or the like. Furthermore, water can be used for dilution in substitution for the organic solvent. In addition, for example as shown in FIG. 4, the outer peripheral face 11U of the monolithic base 10 with a foundation layer formed thereon can be sealed with masking tape 71, the first end face 11S can be fixed to the wide-mouthed funnel lower end (not shown) to thereby enable inflow, from above the monolithic base 10, of the precursor solution 70 (silica sol) to form the silica membrane, and permeation through the surface (foundation layer) of the filtration cell 24. Otherwise, the precursor solution 70 can be deposited on the surface (foundation layer) of the filtration cell 24 by a general dipping process. Then, after increasing the temperature by 100 degrees C./hour and for example maintaining a temperature of 350 to 500 degrees C. for one hour, the temperature is allowed to fall by 100 degrees C./hour. A silica membrane is provided by 1 to 5 repetitions of this type of process of inflow, drying, temperature increase, and temperature decrease. As discussed above, a monolithic separation membrane structure is obtained in which the separation membrane 30 is a silica membrane.

As discussed above, the method of formation of the separation membrane 30 may include use of a suitable method in response to the type of separation membrane 30. In the present specification, the preparation method for the separation membrane 30 is based on those disclosed in the publications cited above.

Other Embodiments

Although an embodiment of the present invention has been described, the present invention is not limited to the above embodiment, and various modifications are possible within a scope that does not depart from the spirit of the invention.

The monolithic separation membrane structure 100 has been provided with filtration cells 24 and water collecting cells 25. However, the water collecting cells may be omitted, and in such a configuration, the monolithic separation membrane structure 100 may also omit the discharge channel 26.

Although all the inner diameters C1 of the filtration cells 24 are configured to be equal, there is no limitation in this regard. Although all the inner diameters C2 of the water collecting cells 25 are configured to be equal, there is no limitation in this regard.

The respective first and second seal portions 14, 15 have been configured to cover a portion of the outer peripheral face 11U. However, the outer peripheral face 11U need not be covered.

EXAMPLES

The examples of a monolithic separation membrane structure according to the present invention will be described below. However, the present invention is not thereby limited to the following examples.

Preparation of Examples No. 1 to No. 3, and 5 to 11

A monolithic separation membrane structure according to Examples No. 1 to No. 3 and No. 5 to No. 11 was prepared as described below.

Firstly, 70 volume % of alumina particles (aggregate) having an average particle diameter of 12 μm was added to 30 volume % of an inorganic binding material, then as required, further addition was made of a molding auxiliary agent such as an organic binder or the like and a pore forming agent, and mixed and dried. Then, a clay was prepared by adding water and a surface active agent, and mixing and kneading. The inorganic binding material that was used includes $SiO_2$ such as talc, kaolin, talc, feldspar, clay or the like (70 mass %), $Al_2O_3$ (16 mass %), alkali earth metals and alkali metals (11 mass %), and was suitably mixed to reach the target content ratios.

Next, the clay was extrusion molded to thereby form a monolithic green body that has a plurality of cells. The resulting green body was fired (1250 degrees C., 1 hour) to thereby obtain a monolithic base. After firing, the size of the monolithic base had a width of 63 mmφ and a length of 300 mm.

Next, a cut was created using a diamond disk cutter along the water collecting cell row respectively on both end faces of the monolithic base. At that time, an adjustment to the distance of cutting in a longitudinal direction and the thickness of the diamond disk changed the sum of the length of the width of the opening of the discharge channel as shown in Table 1. It is noted that the position of placing the cut was varied so that the row number of filtration cell rows disposed between two rows of water collecting cell rows ("number of filtration cell rows between water collecting cell rows") is as shown in Table 1.

Next, a polyester film was adhered to both end faces of the monolithic base, and a hole was drilled with reference to a laser irradiation on a portion corresponding to the water collecting cell row.

Then, both end faces of the monolithic base were pressed into a plugging material that is in a slurry configuration. The plugging material was configured by adding a glass binding material to a main component of alumina aggregate, and then water and a binder were added and mixed.

The monolithic base filled with the plugging material was fired (950 degrees C., one hour) to thereby obtain a plugging material filled monolithic base.

The sum of the opening length and the opening width of the discharge channel that opens onto an outer peripheral face of the main body, the outer wall thickness, the partition wall thickness, and inner diameter of the filtration cells are shown in Table 1. The inner diameter of the water collecting cells, the partition wall thickness between water collecting cells, and the partition wall thickness between the filtration cells and the water collecting cells were the same as the filtration cells.

Next, 14 parts by mass of an inorganic binding material was added to 100 parts by mass of alumina particles (aggregate) having an average particle diameter of 2.3 μm, and then further addition was made of water, a dispersion agent and a thickening agent, and mixed to prepare a first intermediate layer slurry. The slurry was used in accordance with a filtration film forming method as disclosed in Japanese Patent Application Laid-Open No. 63-66566 to thereby attach the slurry to the inner peripheral face of the through holes for the filtration cells. Thereafter, a first intermediate layer was formed by firing (950 degrees C., 1 hour) in an electrical furnace in an atmosphere of air. The inorganic binding material includes a glass starting material containing $SiO_2$ (77 mol %), $ZrO_2$ (10 mol %), $LiO_2$ (3.5 mol %), $Na_2O$ (4 mol %), $K_2O$ (4 mol %), CoO (0.7 mol %), and MgO (0.8 mol %) that is melted at 1600 degrees C., made uniform and then cooled and pulverized to have an average particle diameter of 1 μm.

Next, 20 parts by mass of an inorganic binding material was added to 100 parts by mass of titania particles (aggregate) having an average particle diameter of 0.3 μm, and mixed with an organic binder, a pH regulating agent, and an surface active agent to thereby prepare a second intermediate layer slurry.

Then, a green body for the second intermediate layer was formed by depositing the second intermediate layer slurry onto an inner surface of the first intermediate layer by use of a filtration method.

Next, the second intermediate layer was formed by firing (950 degrees C., 1 hour) the green body for the second intermediate layer.

Then, after using spray atomization to coat the glass starting material slurry onto an end face of the monolithic base with the intermediate layer attached thereto, a seal portion was formed on the end face by firing (950 degrees C., 1 hour).

Next, a titania sol was obtained by hydrolysis of titanium isopropoxide in the presence of nitric acid and diluted with water to thereby prepare a third intermediate (foundation layer) slurry.

Next, after distributing the third intermediate slurry onto an inner surface of the second intermediate layer, a third intermediate layer was formed by thermal treatment (425 degrees C., 1 hour).

The total thickness of the first intermediate layer, second intermediate layer, and third intermediate layer (referred to below as "intermediate layer") is shown in Table 1.

Next, a silica sol was obtained by hydrolysis of p-tolyltrimethoxysilane in the presence of nitric acid and diluted with ethanol to thereby prepare a separation membrane precursor solution.

Next, after distributing the separation membrane precursor solution onto an inner surface of the third intermediate layer, the separation membrane was formed by thermal treatment (400 degrees C., 1 hour).

Preparation of Examples 4 and 12

In Examples 4 and 12, a monolithic separation membrane structure was prepared using the same steps as those used for Examples 1 to 3, and 5 to 11 with the exception that in the preparation process of the monolithic base, (1) there was addition of 40 volume % of an inorganic binding material to 60 volume % of alumina particles (aggregate) having an average particle diameter of 12 μm, (2) an inorganic binding material including $SiO_2$ such as talc, kaolin, talc, feldspar, clay or the like (14 mass %), $Al_2O_3$ (80 mass %), alkali earth metals and alkali metals (3 mass %) was used and suitably mixed to reach the target content ratio, and (3) the firing conditions were 1525 degrees C. and one hour.

As discussed above, a monolithic separation membrane structure was completed according to Examples 1 to 12. The surface area of the separation membrane per unit volume of the monolithic separation membrane structure, and the surface area of the separation membrane per unit weight of the monolithic separation membrane structure are shown in Table 1.

Preparation of Comparative Example 1

In Comparative Example 1, a monolithic separation membrane structure was prepared using the same steps as those used for Examples 1 to 12 with the exception in the preparation process of the clay, there was addition of 20 volume % of an inorganic binding material to 80 volume % of alumina particles (aggregate) having an average particle diameter of 80 μm, and during extrusion molding, the inner diameter of the filtration cells, the partition wall thickness and the thickness of the intermediate layer were increased as shown in Table 1.

Preparation of Comparative Example 2

In Comparative Example 2, since the inner diameter during extrusion molding was set to 0.9 mm to increase the number of filtration cells as shown in Table 1, the intermediate layer slurry became blocked in the filtration cell inner portion during film formation of the intermediate layer, and therefore an intermediate layer could not be formed.

Preparation of Comparative Example 3

In Comparative Example 3, since the partition wall thickness was set to 0.04 mm, the monolithic base could not be formed due to insufficient strength resulting from the partition wall thickness being too low and a monolithic structure not being maintained.

Preparation of Comparative Example 4

In Comparative Example 4, a monolithic separation membrane structure was prepared using the same steps as those used for Examples 1 to 12 with the exception that the thickness of the intermediate layer was reduced as shown in Table 1.

Ethanol Permeation Testing

The monolithic separation membrane structure according to Examples 1 to 12 and Comparative Examples 1 and 4 was assembled into a separation device and the pressure at the outer periphery of the monolithic separation membrane structure was reduced to 45 Torr while causing flow of a mixed fluid of an organic solvent (n-octane: 33 volume %, p-xylene: 33 volume %) and ethanol (33 volume %) into a filtration cell on an inner side of the separation membrane.

Ethanol flowing from the opening of the discharge channel after permeating the separation membrane was recovered. An ethanol permeation rate was calculated based on the separation processing time and the mass of recovered ethanol, and the permeation concentration of recovered ethanol was measured.

Isostatic Strength Test

The isostatic strength of the monolithic separation membrane structure was measured in relation to Examples 1 to 12 and Comparative Examples 1 and 4 in accordance with the measurement method for isostatic fracture strength prescribed in JASO Standard M505-87 that is an automotive standard that is published by the Japan Society of Automotive Engineers. Isostatic strength is the fracture strength as measured by application of hydrostatic pressure in water.

In Table 1, a configuration that did not fracture even upon application of 20 MPa was evaluated as "O (good)", whereas a configuration that fractured at greater than or equal to 5 MPa and less than 20 MPa was evaluated as "Δ (acceptable)".

inner diameter of the filtration cells was configured as less than or equal to 2.0 mm from the conventional value of 2.2 mm, the partition wall thickness was reduced to less than 0.2 mm from the conventional value of 0.8 mm, and the thickness of the intermediate layer was reduced to less than 100 μm from the conventional value of 170 μm.

TABLE 1

| | Filtration Cell | | | Number of | Outer Wall | | Discharge Channel | |
| --- | --- | --- | --- | --- | --- | --- | --- | --- |
| | Inner Diameter (not including Intermediate Layer, Separation Membrane) mm | Partition Wall Thickness mm | Intermediate Layer Thickness μm | Filtration Cell Rows between Water Collecting Cell Rows rows | Thickness mm | Outer Wall Thickness/ Inner Wall Thickness times | Opening Width mm | Total of Opening Length mm |
| Example 1 | 1.85 | 0.15 | 70 | 4 | 1.5 | 10 | 0.8 | 24 |
| Example 2 | 1.85 | 0.15 | 90 | 6 | 1.5 | 10 | 0.8 | 24 |
| Example 3 | 1.10 | 0.05 | 20 | 4 | 1.5 | 30 | 0.3 | 24 |
| Example 4 | 2.00 | 0.19 | 95 | 4 | 1.5 | 8 | 0.8 | 24 |
| Example 5 | 1.85 | 0.15 | 70 | 2 | 1.5 | 10 | 0.8 | 20 |
| Example 6 | 1.85 | 0.15 | 70 | 9 | 1.5 | 10 | 0.8 | 50 |
| Example 7 | 1.85 | 0.15 | 70 | 1 | 1.5 | 10 | 0.8 | 24 |
| Example 8 | 1.85 | 0.15 | 70 | 10 | 1.5 | 10 | 0.8 | 60 |
| Example 9 | 1.85 | 0.15 | 70 | 4 | 1.5 | 10 | 0.2 | 9 |
| Example 10 | 1.85 | 0.15 | 70 | 4 | 0.9 | 6 | 0.8 | 24 |
| Example 11 | 1.85 | 0.15 | 70 | 4 | 6 | 40 | 0.8 | 24 |
| Example 12 | 2.00 | 0.19 | 95 | 4 | 6 | 40 | 0.8 | 24 |
| Comparative Example 1 | 2.2 | 0.8 | 170 | 4 | 4 | 5 | 0.8 | 24 |
| Comparative Example 2 | 0.9 | 0.15 | — | — | — | — | — | — |
| Comparative Example 3 | 1.85 | 0.04 | — | — | — | — | — | — |
| Comparative Example 4 | 1.85 | 0.15 | 15 | 4 | 1.5 | 10 | 0.8 | 24 |

| | Separation Membrane Size | | Separation Membrane Surface Area | | Ethanol Permeation Performance | | Strength Testing Evaluation |
| --- | --- | --- | --- | --- | --- | --- | --- |
| | Diameter φ mm | Length L mm | Per Unit Volume m²/L | Per Unit Weight m²/kg | Permeation Rate kg/hr | Permeation Concentration vol % | |
| Example 1 | 63 | 300 | 1.04 | 1.06 | 2.7 | 85 | O |
| Example 2 | 63 | 300 | 1.10 | 1.06 | 2.6 | 82 | O |
| Example 3 | 63 | 300 | 1.97 | 2.57 | 4.3 | 78 | O |
| Example 4 | 63 | 300 | 0.92 | 0.67 | 2.4 | 93 | O |
| Example 5 | 63 | 300 | 0.87 | 0.89 | 2.2 | 83 | O |
| Example 6 | 63 | 300 | 1.17 | 1.20 | 2.0 | 63 | O |
| Example 7 | 63 | 300 | 0.65 | 0.66 | 1.7 | 83 | O |
| Example 8 | 63 | 300 | 1.20 | 1.23 | 1.6 | 53 | O |
| Example 9 | 63 | 300 | 1.04 | 1.06 | 2.1 | 84 | O |
| Example 10 | 63 | 300 | 1.11 | 1.23 | 2.8 | 86 | Δ |
| Example 11 | 63 | 300 | 0.75 | 0.57 | 1.6 | 84 | O |
| Example 12 | 63 | 300 | 0.66 | 0.36 | 1.3 | 89 | O |
| Comparative Example 1 | 63 | 300 | 0.40 | 0.23 | 0.84 | 72 | O |
| Comparative Example 2 | — | — | — | — | — | — | — |
| Comparative Example 3 | — | — | — | — | — | — | — |
| Comparative Example 4 | 63 | 300 | 1.1 | 1.4 | 1.6 | 33 | O |

As shown in Table 1, the separation membrane surface area per unit weight and the separation membrane surface area per unit volume in Examples 1 to 12 was enhanced when compared to Comparative Example 1 (prior art example). This feature is due to the fact that the total surface area of the separation membrane was increased since the From the point of view of increasing the separation membrane surface area, small values are preferred in relation to an inner diameter of the filtration cells, the partition wall thickness and the intermediate layer thickness. Therefore in comparison to Example 1, since Example 3 had an inner diameter reduction from 1.85 to 1.10, a partition wall thickness reduction from 0.15 mm to 0.05 mm, a thickness reduction in the intermediate layer from 70 μm to 20 μm, a large enhancement in the separation membrane surface area was enabled, and the permeation rate could be enhanced. It is noted that in Example 3, since the inner diameter of the water collecting cells was reduced to 1.10 mm at the same time, the opening width was reduced from 0.8 mm to 0.3 mm in order to facilitate processing of the discharge channel.

On the other hand, defects occur when the inner diameter of the filtration cells, the partition wall thickness and the intermediate layer are excessively reduced. When the inner diameter of the filtration cell was reduced to 0.9 mm as in Comparative Example 2, an intermediate layer could not be formed since the intermediate layer slurry became blocked in an inner portion of the filtration cells during film formation of the intermediate layer. When the partition wall thickness was configured as 0.04 mm as in Comparative Example 3, the monolithic base could not be formed during extrusion molding as a result of an overly thin inner wall causing insufficient strength and a monolithic structure not being maintained. When the intermediate layer thickness was configured as 15 μm as in Comparative Example 4, since the filtration cell surface could not be sufficiently smoothed and/or since there were portions of the surface that could not be covered, defects occurred in the separation membrane that was formed on those portions, and concentration was almost not possible (there was the same concentration as the original mixed fluid).

In Examples 1 to 12, the ethanol permeation concentration was increased in comparison to Comparative Example 4. This feature is due to the fact that defects in the separation membrane were inhibited by smoothing of the surface due to maintenance of the thickness of the intermediate layer.

In Example 4, even when the respective values for the inner diameter of the filtration cells, the partition wall thickness, the thickness of the intermediate layer and the material density are configured in the most disadvantageous state in relation to the membrane surface area, required permeation performance can be maintained as long as the values fall within the design range of the present application.

As described above, it has been confirmed that the permeation performance of a monolithic separation membrane structure can be maintained while enabling an increase in compactness and/or a reduction in weight by a configuration in which the partition wall thickness is greater than or equal to 0.05 mm and less than 0.2 mm, a thickness of the intermediate layer is greater than or equal to 20 μm and less than 100 μm, and the inner diameter of a filtration cell through hole is greater than or equal to 1.0 mm and less than or equal to 2.0 mm.

Next, the number of filtration cell rows between water collecting cell rows will be described.

In Example 6, the permeation rate for ethanol could be more enhanced when compared to Example 8. This feature is due to the reduction in pressure loss by a configuration in which the number of filtration cell rows between water collecting cell rows was less than or equal to 9 thereby reducing the distance for permeation into the partition wall by ethanol that has been separated on the separation membrane surface. From the point of view of reducing pressure loss, since smaller values for the number of filtration cell rows between water collecting cell rows are advantageous, a further enhancement to the permeation rate was enabled in Example 1.

On the other hand, when the number of filtration cell rows between water collecting cell rows is reduced, the number of water collecting cells is relatively increased since the water collecting cell row number is increased, and therefore the surface area of the separation membrane is reduced due to the reduction in the number of filtration cells. Consequently, the permeation rate was reduced in Example 5, notwithstanding the fact that the number of filtration cell rows between water collecting cell rows was smaller than Example 1. This feature is due to the greater effect of a reduction in the membrane surface area than the effect of a reduction in pressure loss.

Furthermore, since the number of filtration cell rows between water collecting cell rows in Example 7 was 1, the permeation rate was reduced due to the reduction in the membrane surface area resulting from the large reduction in the filtration cell number. Due to the above result, it can be seen that it is particularly preferred that the number of filtration cell rows between water collecting cell rows is greater than or equal to 4 rows and less than or equal to 6 rows from the point of view of reducing pressure loss during ethanol permeation and of maintaining a high surface area for the separation membrane.

Next, the sum of the slit opening width and opening length is described. In Example 9, the ethanol permeation rate was reduced in comparison to Example 1. This feature is due to the fact that ethanol that had permeated through the water collecting cell row underwent pressure loss in the slit opening as a result of a small slit opening width and slit opening length. It is noted that in Example 6 and Example 8, the number of filtration cell rows between water collecting cell rows was large and a greater amount of the permeation component was concentrated by one row of a water collecting row. Therefore pressure loss was reduced by increasing the opening length. Consequently, it can be understood that the slit opening width is preferably greater than or equal to 10% of the inner diameter of the water collecting cell, and the sum of the slit opening length is preferably greater than or equal to 3.3% of the total length of the monolithic base.

Next, the outer wall thickness will be described. In Example 10, the outer wall thickness took a low value of 0.9 mm (6 times the partition wall thickness). Therefore although the ethanol permeation rate was enhanced in comparison to Example 1 due to the increase in the membrane surface area, the results of strength testing demonstrate that the structure collapsed at less than 20 MPa. On the other hand, in Example 11, since the outer wall thickness took a high value of 6 mm (40 times the partition wall thickness), the ethanol permeation rate was reduced as a result of the relative reduction in the membrane surface area. Furthermore, in Example 12, since there was a further increase to the outer wall thickness in addition to the respective values for the inner diameter of the filtration cells, the partition wall thickness, the thickness of the intermediate layer and the material density being configured in the most disadvantageous state in relation to membrane surface area, the membrane surface area per unit weight became less than or equal to 0.5 m$^2$/kg resulting in a large reduction in the permeation rate. In light of the above description, it has been confirmed that the outer wall thickness is preferably greater than or equal to 10 times and less than or equal to 30 times the partition wall thickness.

The invention claimed is:

1. A monolithic separation membrane structure comprising:
   a monolithic base having a plurality of filtration cells respectively extending from a first end face to a second end face,
   an intermediate layer formed on an inner surface of the filtration cells, and a separation membrane formed on an inner surface of the intermediate layer, wherein an inner diameter of the plurality of respective filtration cells, not including the intermediate layer and the separation membrane, is greater than or equal to 1.0 mm to less than or equal to 2.0 mm, a partition wall thickness of a shortest portion of the monolithic base between two adjacent filtration cells of the plurality of filtration cells is greater than or equal to b 0.05 mm to less than 0.2 mm, a thickness of the intermediate layer is greater than or equal to 20 μm to less than 100 μm, and an outer wall thickness of the monolithic base is greater than or equal to 10 times and less than or equal to 30 times the partition wall thickness.

2. The monolithic separation membrane structure according to claim 1, wherein the monolithic base includes a plurality of water collecting cells that respectively extend from the first end face to the second end face and in which both end faces are blocked, the plurality of filtration cells form a plurality of filtration cell rows respectively including 2 or more filtration cells aligned along a predetermined direction when the first end face is viewed in plan, the plurality of water collecting cells form a plurality of water collecting cell rows respectively including 2 or more water collecting cells aligned along the predetermined direction when the first end face is viewed in plan, and greater than or equal to 2 rows and less than or equal to 9 rows of filtration cell rows of the plurality of filtration cell rows are disposed between two rows of the water collecting cell rows of the plurality of water collecting cell rows.

3. The monolithic separation membrane structure according to claim 1, wherein the monolithic base includes a plurality of discharge channels that respectively penetrate the plurality of water collecting cell rows, the plurality of respective discharge channels includes an opening that opens on an outer peripheral face of the monolithic base, and a width of the opening in a peripheral direction about an axial center of the monolithic base is greater than or equal to 10% and less than or equal to 80% of an inner diameter of the water collecting cells.

4. The monolithic separation membrane structure according to claim 3, wherein a length of the opening in a longitudinal direction of the monolithic base is greater than or equal to 3.3% and less than or equal to 40% of the total length of the monolithic base in a longitudinal direction.

5. The monolithic separation membrane structure according to claim 1, wherein an isostatic strength of the monolithic separation membrane structure is greater than or equal to 20 MPa.

6. The monolithic separation membrane structure according to claim 1, wherein a surface area per unit volume of the plurality of separation membranes is greater than or equal to 1 $m^2$/L.

7. The monolithic separation membrane structure according to claim 1, wherein a surface area per unit weight of the plurality of separation membranes is greater than or equal to 0.5 $m_2$/kg.

8. A method of manufacturing a monolithic separation membrane structure comprising:

forming a monolithic green body using aggregate particles having an average particle diameter of greater than or equal to 5 μm and less than 40 μm, firing the green body to form a monolithic base having a plurality of filtration cells respectively extending from a first end face to a second end face, forming an intermediate layer on an inner surface of the filtration cells, and forming a separation membrane on an inner surface of the intermediate layer, wherein an inner diameter of the plurality of respective filtration cells, not including the intermediate layer and the separation membrane, in the monolithic base is greater than or equal to 1.0 mm to less than or equal to 2.0 mm, a partition wall thickness of a shortest portion of the monolithic base between two adjacent filtration cells of the plurality of filtration cells is greater than or equal to 0.05 mm to less than 0.2 mm, a thickness of the intermediate layer is greater than or equal to 20 μm to less than 100 μm and an outer wall thickness of the monolithic base is greater than or equal to 10 times and less than or equal to 30 times the partition wall thickness.

9. The method of manufacturing a monolithic separation membrane structure according to claim 8 comprising:

forming a cut for a discharge channel by cutting into the first end face of the monolithic base after firing, filling a plugging material into the cut, and firing the plugging material.

10. The monolithic separation membrane structure according to claim 1, wherein the monolithic base contains an aggregate selected from the group consisting of alumina, silicon carbide, titania, mullite, selben, and cordierite.

* * * * *